(12) United States Patent
Liao

(10) Patent No.: US 6,644,582 B1
(45) Date of Patent: Nov. 11, 2003

(54) CABLE REEL WITH A POSITIONING MECHANISM

(76) Inventor: Sheng Hsin Liao, No. 10, Alley 38, Lane 229, San Chun St., Shulin City, Taipei Hsien (TW)

(*) Notice: Subject to any disclaimer, the term of this patent is extended or adjusted under 35 U.S.C. 154(b) by 0 days.

(21) Appl. No.: 10/189,235

(22) Filed: Jul. 5, 2002

(51) Int. Cl.[7] .............................................. B65H 75/48
(52) U.S. Cl. .................................. 242/378.1; 242/375.1
(58) Field of Search ......................... 242/378.1, 375.1; 191/12.2 R; 439/501

(56) References Cited

U.S. PATENT DOCUMENTS

| | | | | |
|---|---|---|---|---|
| 5,632,453 A | * | 5/1997 | Hioki et al. .............. 242/385.1 |
| 6,056,591 A | * | 5/2000 | Liao ............................ 439/501 |
| 6,134,801 A | * | 10/2000 | Miyasaka .................... 33/767 |
| 6,135,254 A | * | 10/2000 | Liao ............................ 191/12.4 |
| 6,273,354 B1 | * | 8/2001 | Kovacik et al. ............ 242/404 |
| 6,315,231 B1 | * | 11/2001 | Liaom ....................... 242/378.1 |
| 6,349,808 B1 | * | 2/2002 | Bryant .................... 191/12.2 R |
| 6,439,491 B1 | * | 8/2002 | Liao ......................... 242/378.1 |

FOREIGN PATENT DOCUMENTS

JP          404106078 A    *    4/1992

* cited by examiner

Primary Examiner—Kathy Matecki
Assistant Examiner—Evan Langdon
(74) Attorney, Agent, or Firm—Birch, Stewart, Kolasch & Birch, LLP

(57) ABSTRACT

A cable reel with a positioning mechanism includes a reel casing having a chamber therein; a cylindrical receptacle having a circumferential tracing line groove formed on a sidewall of the cylindrical receptacle; a winding plate having a pivot hole thereon and a guiding groove formed on an interior wall within the pivot hole, wherein the winding plate is pivotally mounted on the cylindrical receptacle through the pivot hole; a communication cable wound against the winding plate; a swirling spring connecting the reel casing with the winding plate; and a ball bearing movably disposed in the tracing line groove.

8 Claims, 10 Drawing Sheets

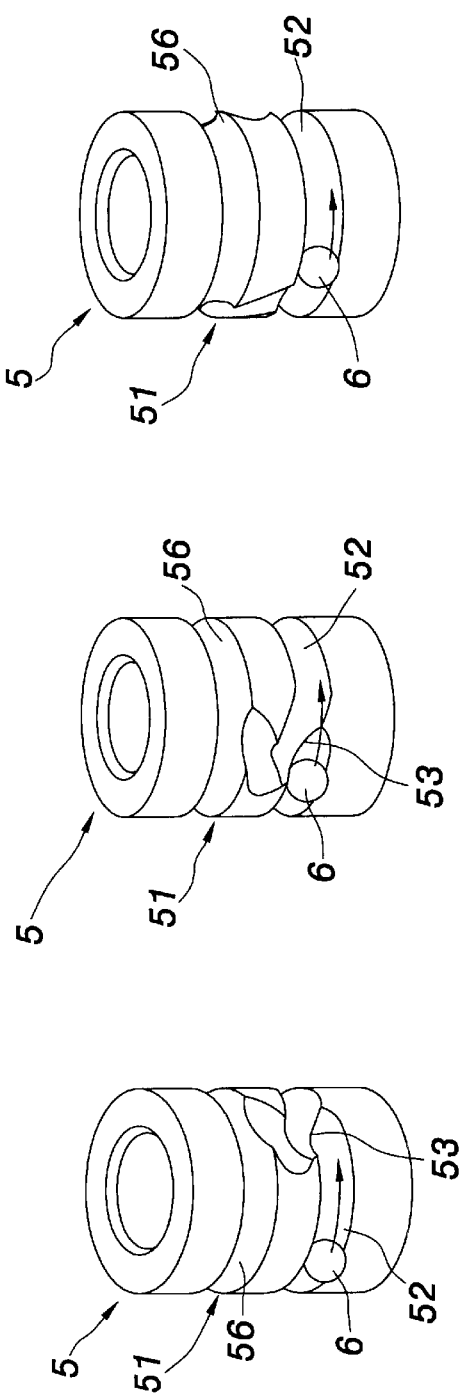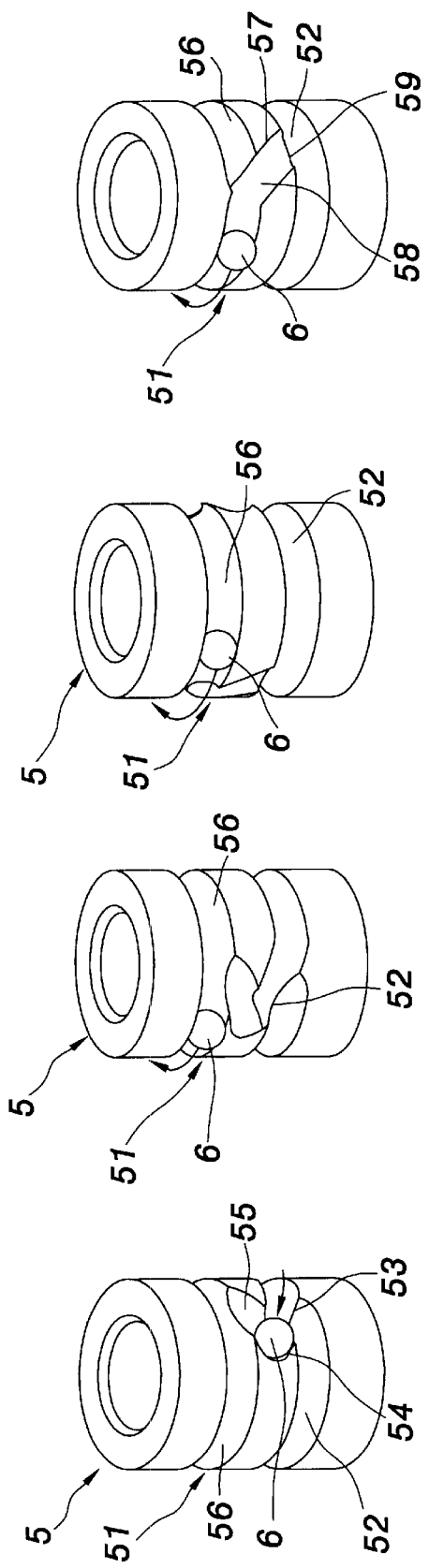

CABLE REEL WITH A POSITIONING MECHANISM

BACKGROUND OF THE INVENTION

1. Field of the Invention

The present invention relates to a communication cable reel with a positioning mechanism. More particularly, this invention relates to a cable reel capable of flexibly winding a communication cable, thereby preventing cable entangling or insufficient length of the cable from occurring. Further, it is convenient for a user to utilize the cable reel structure of this invention since the communication cable can be wound by implementing a "pull-release" action on the communication cable.

2. Description of the Prior Art

Communication cables for connecting a computer with various peripheral devices such as modems, telephones, or fax machines are used extensively. To avoid entangling problem due to excess and loose cable, cable reels are used. Typically, a prior art communication cable reel comprises a reel casing, a winding plate, a drum, a swirling spring, and wound cable therein.

The energy required for rotation of the drum during winding of the cable is provided by the swirling spring. A brake mechanism typically is provided to lock the drum when the desired cable length has been wound off. For this purpose the brake mechanism capitalizing on a swing strip allows the drum to rotate in one direction only, i.e. the winding-off direction. The swing strip typically engages with indentations on peripheral of the winding plate.

However, the above-mentioned prior art cable reel has a complicated structure and, therefore, quite costly to fabricate and inconvenient to assembly and utilize.

SUMMARY OF THE INVENTION

It is therefore the primary objective of the claimed invention to provide a cable reel structure capitalizing on interaction between a ball bearing and a tracing line groove, which is simplified, and is therefore easy to assembly and fabricate. The mechanism provided by this invention is user-friendly. A user can easily position the communication cable at a proper length.

In accordance with the claimed invention, a cable reel with a positioning mechanism is provided. The cable reel comprises a reel casing having a chamber therein; a cylindrical receptacle having a tracing line groove formed on sidewall of the cylindrical receptacle; a winding plate having a pivot hole thereon and a guiding groove formed on interior wall within the pivot hole, wherein the winding plate is pivotally mounted on the cylindrical receptacle through the pivot hole; a communication cable wound against the winding plate; a swirling spring connecting the reel casing with the winding plate; and a ball bearing movably disposed in the tracing line groove and moving against the guiding groove.

These and other objectives of the claimed invention will no doubt become obvious to those of ordinary skill in the art after reading the following detailed description of the preferred embodiment, which is illustrated in the various figures and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 9A to 9G are schematic diagrams showing the ball bearing and the tracing line groove.

DETAILED DESCRIPTION OF THE PREFERRED EMBODIMENTS

Figure 1:
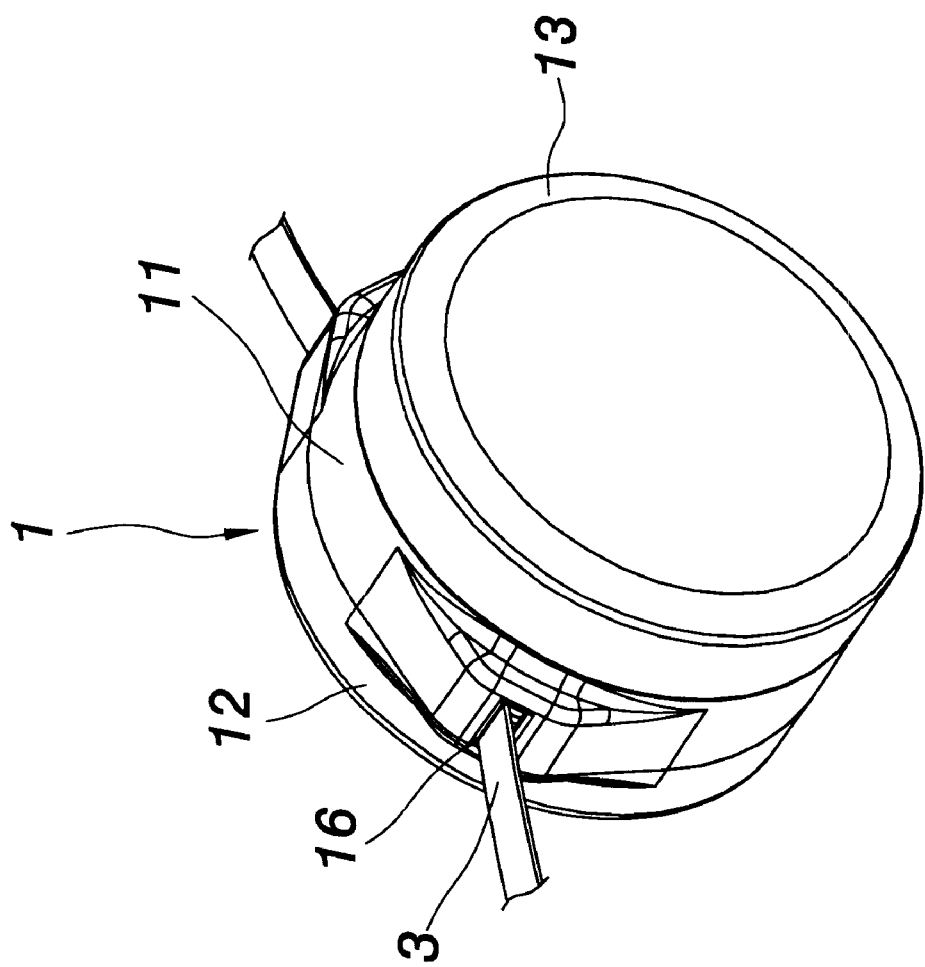
FIG. 1 is a typical view according to the present invention.
Figure 2:
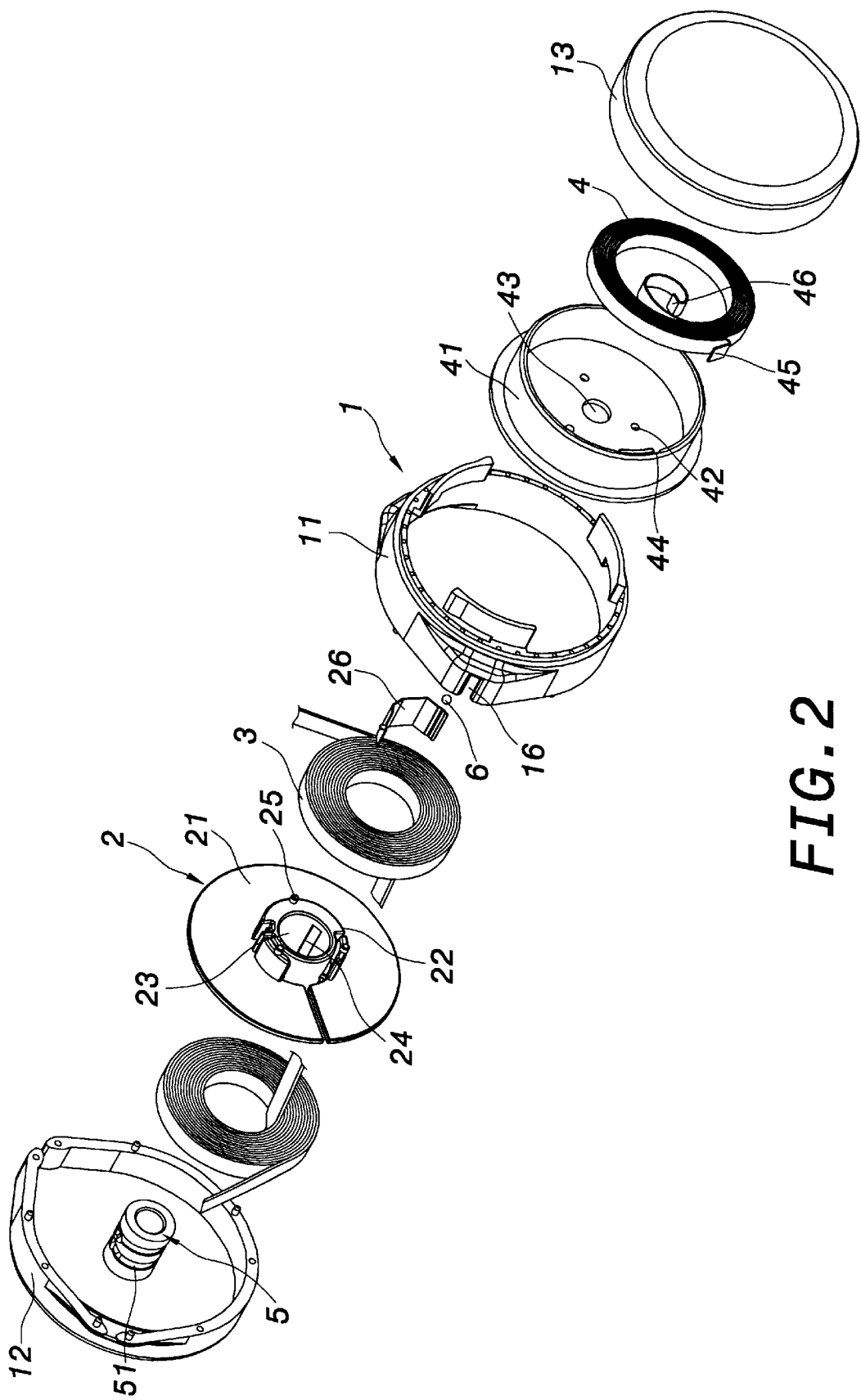
FIG. 2 is an exploded perspective diagram of FIG. 2 according to the present invention.
Figure 3:
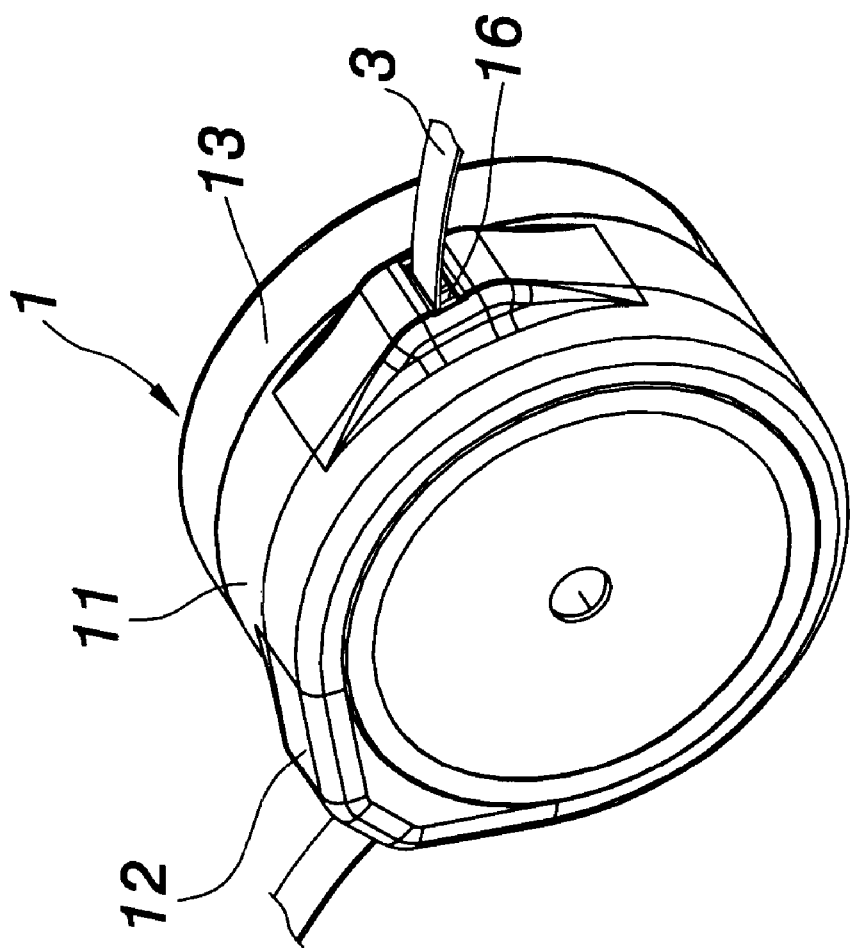
FIG. 3 is a typical view in another aspect according to the present invention.
Figure 4:
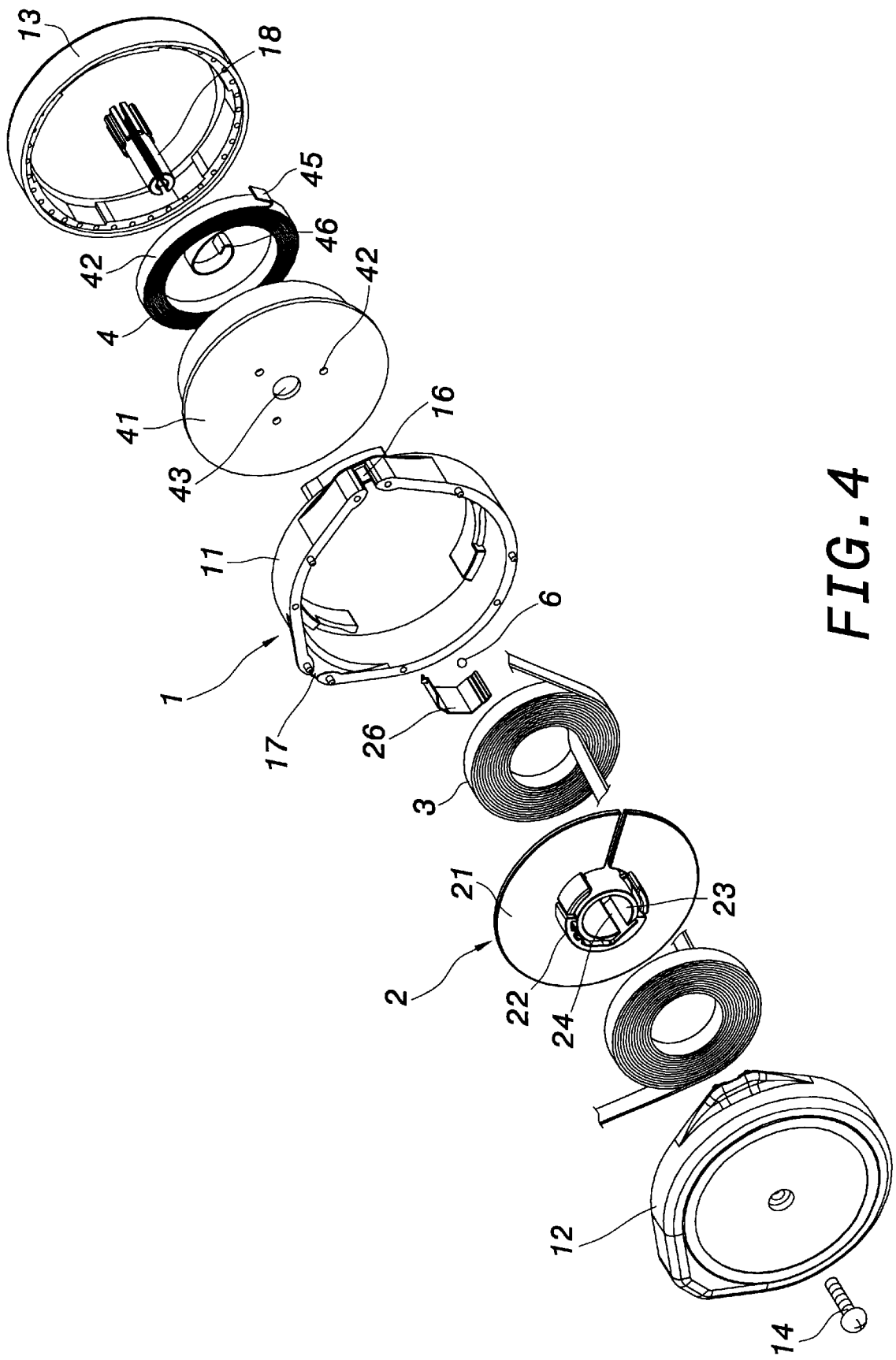
FIG. 4 is an exploded perspective diagram of FIG. 3 according to the present invention.
Figure 5:
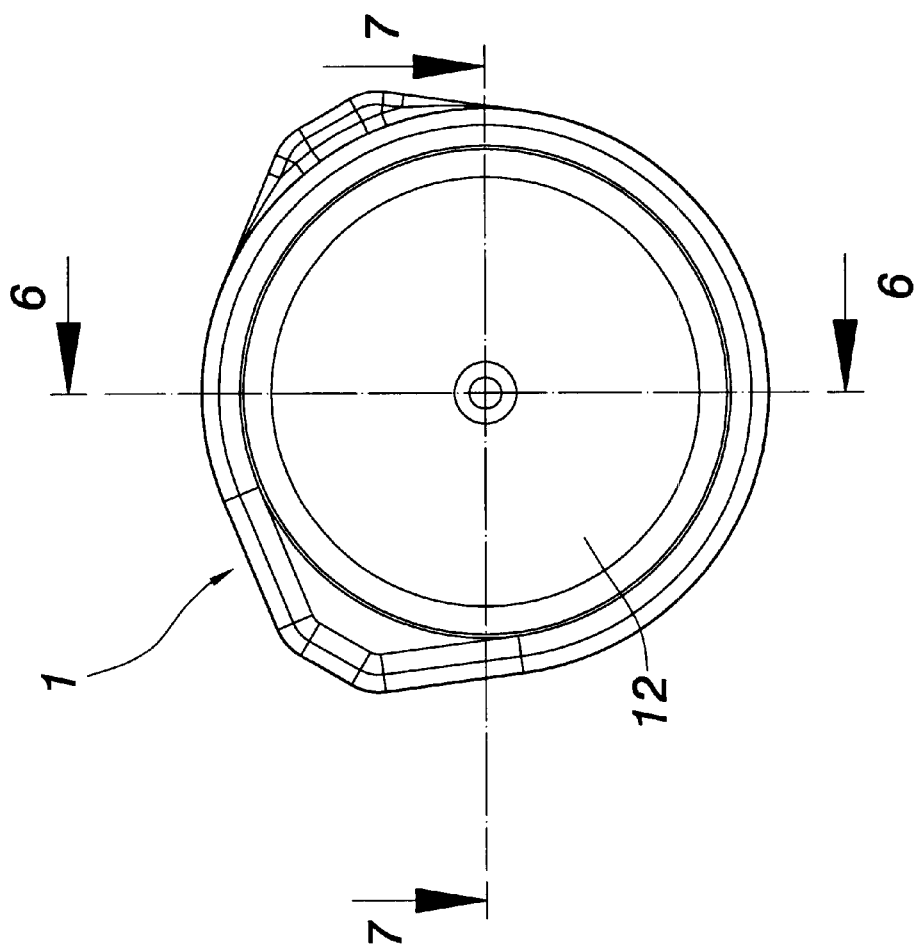
FIG. 5 is a side view according to the present invention.

Referring to FIG. 1 to FIG. 5, this invention provides an improved cable reel device with a positioning mechanism. As shown in figures, cable reel of this invention comprises a reel casing 1, a winding plate 2, a communication cable 3, and a swirling spring 4. The reel casing 1 is comprised of a main body 11, a first casing 12, and a second casing 13. As illustrated, the main body 11 is a cylindrical hollow structure. The first casing 12 and the second casing 13 are the congruent halves. The main body 11, first casing 12, and second casing 13 form the enclosure of the invention herein. The main body 11 is fixed to the second casing 13 by proper means such as a snap fastener known in the art. The first casing 12 is screwed onto the combined main body 11 and the second casing 13.

Figure 6:
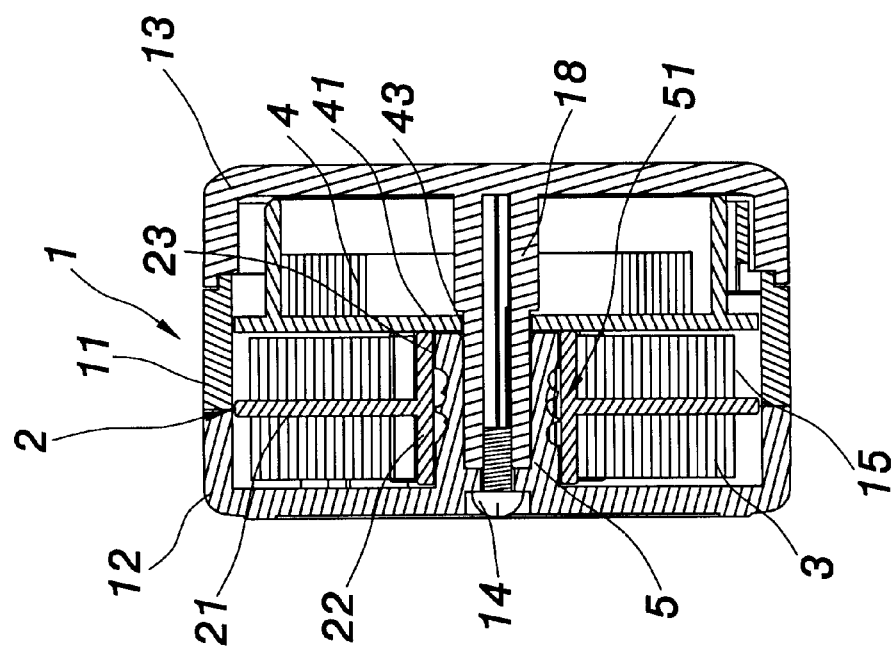
FIG. 6 is a cross-sectional view of FIG. 5 along line 6—6.
Figure 7:
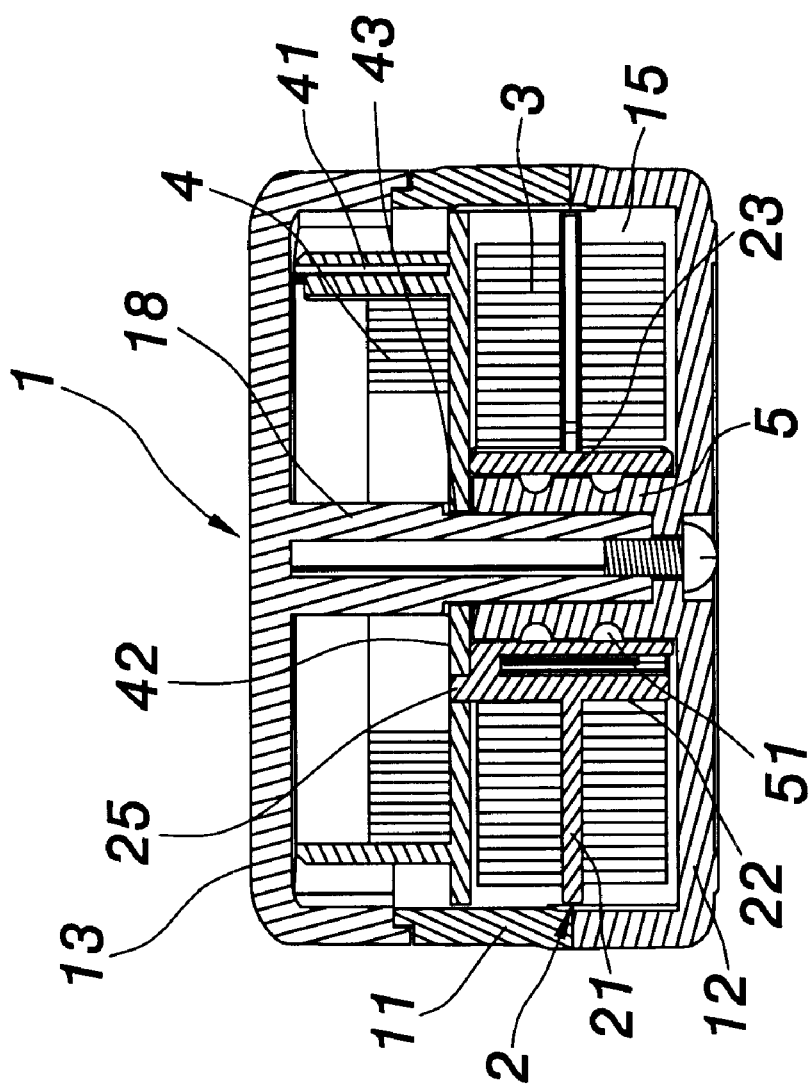
FIG. 7 is a cross-sectional view of FIG. 5 along line 7—7.

Referring to FIGS. 6 and 7, the reel casing 1 has a chamber 15 therein for fittingly accommodating the winding plate 2, the communication cable 3 and the swirling spring 4. A first aperture 16 and a second aperture 17 are provided on peripheral wall of the reel casing 1. Two terminals of the communication cable 3 protrude from the first aperture 16 and second aperture 17 respectively. At the center of the second casing 13 there is provided a spindle 18 for mounting the winding plate 2. A cylindrical receptacle 5 is placed on the first casing 12 corresponding to the spindle 18.

The winding plate 2 has a plate body 21. A winding ring 22 protrudes from two opposite sides of the plate body 21. The plate body 21 and the winding ring 22 include a central pivot hole 23. An axially extending guiding groove 24 is provided in the interior wall within the central pivot hole 23. As mentioned, the winding plate 2 is placed in the chamber 15 of the reel casing 1. When the invention herein is assembled, the pivot hole 23 of the winding plate 2 is placed onto the aforementioned cylindrical receptacle 5 such that the winding plate can rotate around the cylindrical receptacle 5 in the chamber 15.

A spring seat 41 is provided at one side of the winding plate 2. The spring seat 41 is a barrel structure having an opening on one side. At the bottom of the spring seat 41 there are provided a plurality of snapping holes 42 and a central hole 43. On the peripheral wall of the spring seat 41 is a locking structure 44 for securing one end of the swirling spring 4. A plurality of protrusions 25 corresponding to the plurality of snapping holes 42 are formed on the winding ring 22 of the winding plate 2. When assembly, the protrusions 25 are inserted into the snapping holes 42 so that the spring seat 41 is secured to the winding plate 2 at one side and the winding plate 2 and the spring seat 41 can therefore rotate synchronously. The spring seat 41 is also disposed in the chamber 15 of the reel casing 1 and is pivotally mounted on the spindle 18 through the central hole 43.

Generally, terminals of the communication cable 3 are connected to devices such as a plug, an earphone, or the like. The communication cable 3 is wound around the winding ring 22 of the winding plate 2 and forms two rolls of wound cable on opposite sides of the plate body 21. As mentioned, two terminals of the communication cable 3 protrude from the first aperture 16 and the second aperture 17 of the reel casing 1.

The swirling spring 4 is disposed in the spring seat 41. As mentioned, the swirling spring 4 has a first terminal 45 secured to the locking structure 44 of the spring seat 41 such that through the spring seat 41, the swirling spring 4 is in connection with the winding plate 2. The other terminal 46 of the swirling spring 4 is secured to the spindle 18. With this configuration, energy can be stored in the swirling spring 4 when the winding plate 2 rotates.

Figure 8:
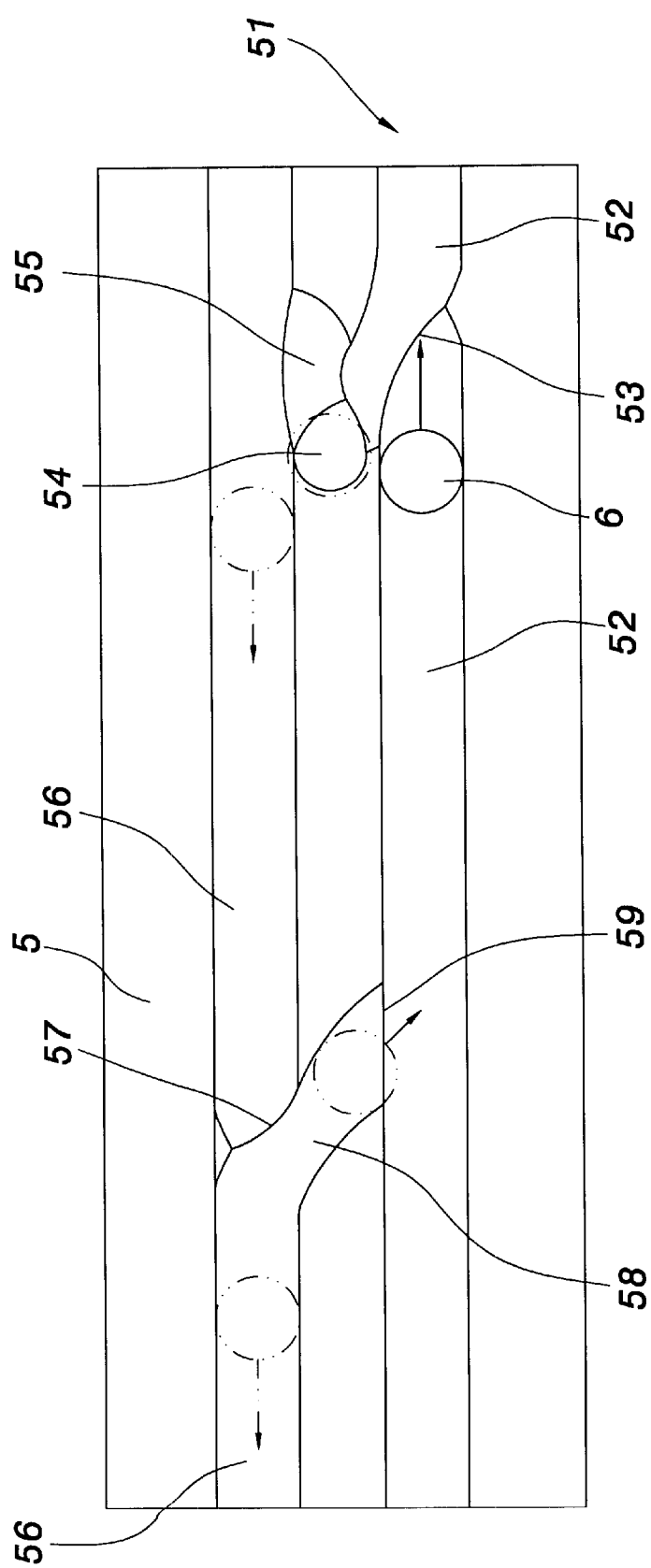
FIG. 8 is an extended diagram illustrating the ball bearing and the tracing line groove.

Referring to FIG. 8, a cylindrical receptacle 5 and a ball bearing 6 are provided in the reel casing 1. A tracing line groove 51 for controlling the pulling or drawing of the communication cable 3 is formed on the cylindrical receptacle 5. The tracing line groove 51 comprises a first trench 52, a first dropping portion 53, a positioning portion 54, a guiding face 55, a second trench 56, a second dropping portion 57, a third trench 58, and a third dropping portion. The first trench 52 surrounds the sidewall of the cylindrical receptacle 5. The first dropping portion 53, which has a relatively higher left side and lower right side, is disposed in the first trench 52. The first dropping portion 53 ensures that the ball bearing 6 only moves in one direction (first direction) in the first trench 52. The positioning portion 54 is placed at the joint between the first trench 52 and the first dropping portion 53. The guiding face 55 has a higher side connected with the positioning portion 54. The first dropping portion 53 guides the ball bearing 6 to position the ball bearing 6 in the positioning portion 54 when the ball bearing 6 starts to move in a reverse direction (second direction) in the first trench 52.

The second trench 56 surrounds the sidewall of the cylindrical receptacle 5 in a parallel manner with the first trench 52. The guiding face 55 has a lower side connected with the second trench 56 such that the ball bearing 6 in the positioning portion 54 will be guided into the second trench 56 through the guiding face 55. The second dropping portion 57, which has a relatively higher right side and lower left side, is disposed in the second trench 56. The second dropping portion 57 ensures that the ball bearing 6 only moves in a reverse direction (second direction) in the second trench 56.

The third trench 58 is connected with the joint between the-second trench 56 and the second dropping portion 57. When the ball bearing 6 starts to move in the first direction in the second trench 56, the second dropping portion 57 guides the ball bearing 6 to slide into the third trench 58. The third dropping portion 59 connects the other side of the third trench 58 and the first trench 52. The third dropping portion 59 has a relatively thicker upper side and a thinner lower side. The third dropping portion 59 ensures that the ball bearing 6 can only moves into the first trench 52 and prevents the ball bearing 6 from moving into the third trench 58 from the first trench 52.

The ball bearing 6 is movably and rotatably mounted in the tracing line groove 51. The ball bearing 6 also moves against the guiding groove 24 of the winding plate 2. A spring piece 26 is mounted in the pivot-hole 23 of the winding plate 2. The spring piece flexibly touches the ball bearing 6 to restrain the ball bearing 6 in the tracing line groove 51. The ball bearing 6 can move axially along the guiding groove 24.

Referring to FIG. 8 and FIG. 9A to FIG. 9G, when the communication cable 3 is drawn out from the reel casing 1, the winding rotates and energy is stored in the swirling spring 4. The wall of the guiding groove 24 pushes the ball bearing 6 restrained in the guiding groove 24, such that the ball bearing 6 moves in the first trench 52 in the first direction. By doing this, the communication cable 3 is smoothly drawn out as illustrated in FIG. 9A to FIG. 9C.

When pulling of the communication cable 3 stops, the swirling spring 4 releases the stored energy potential to force the winding plate 2 making a reverse rotation. When the winding plate 2 rotates in a reverse direction, likewise, the wall of the guiding groove 24 pushes the ball bearing 6 to move along the first trench 52 in the aforementioned second direction. The first dropping portion 53 then guides the ball bearing 6 and positions the ball bearing 6 into the positioning portion 54, as illustrated in FIG. 9D. The communication cable 3 is thus positioned in place.

When one needs to retract the communication cable 3, he or she can slightly pull the two terminals of the communication cable 3, thereby slightly rotating the winding plate 2. By doing this—"pull-release" action, the ball bearing 6 in the positioning portion 54 slides into the second trench 56 by way of the guiding face 55, as illustrated in FIG. 9E. After the ball bearing 6 is in the second trench 56, the energy released by the swirling spring 4 keeps on forcing the winding plate 2 to rotate in a reverse direction and the communication cable 3 can be rapidly retracted inside the reel casing s, as best seen in FIG. 9F and FIG. 9G.

When one needs to use the communication cable 3, he or she pulls the communication cable 3 out. from the reel casing 1. The ball bearing 6 will move in the second trench 56 in the first direction. As mentioned, the ball bearing 6 will slide into the third trench 58, and then into the first trench 52, by way of the second dropping portion 57. After the ball bearing 6 moves into the first trench 52, the mechanism of the invention herein is repeated as described hereinbefore.

It is advantageous that by doing a "pull-release" action the communication cable 3 can be positioned or retracted in the reel casing 1. This invention further features the interaction between the ball bearing 6 and the tracing line groove 51. The structure of this invention is simplified, and is therefore easy to assembly and fabricate. The mechanism provided by this invention is user-friendly. A user can easily position the communication cable at a proper length.

Figure 10:
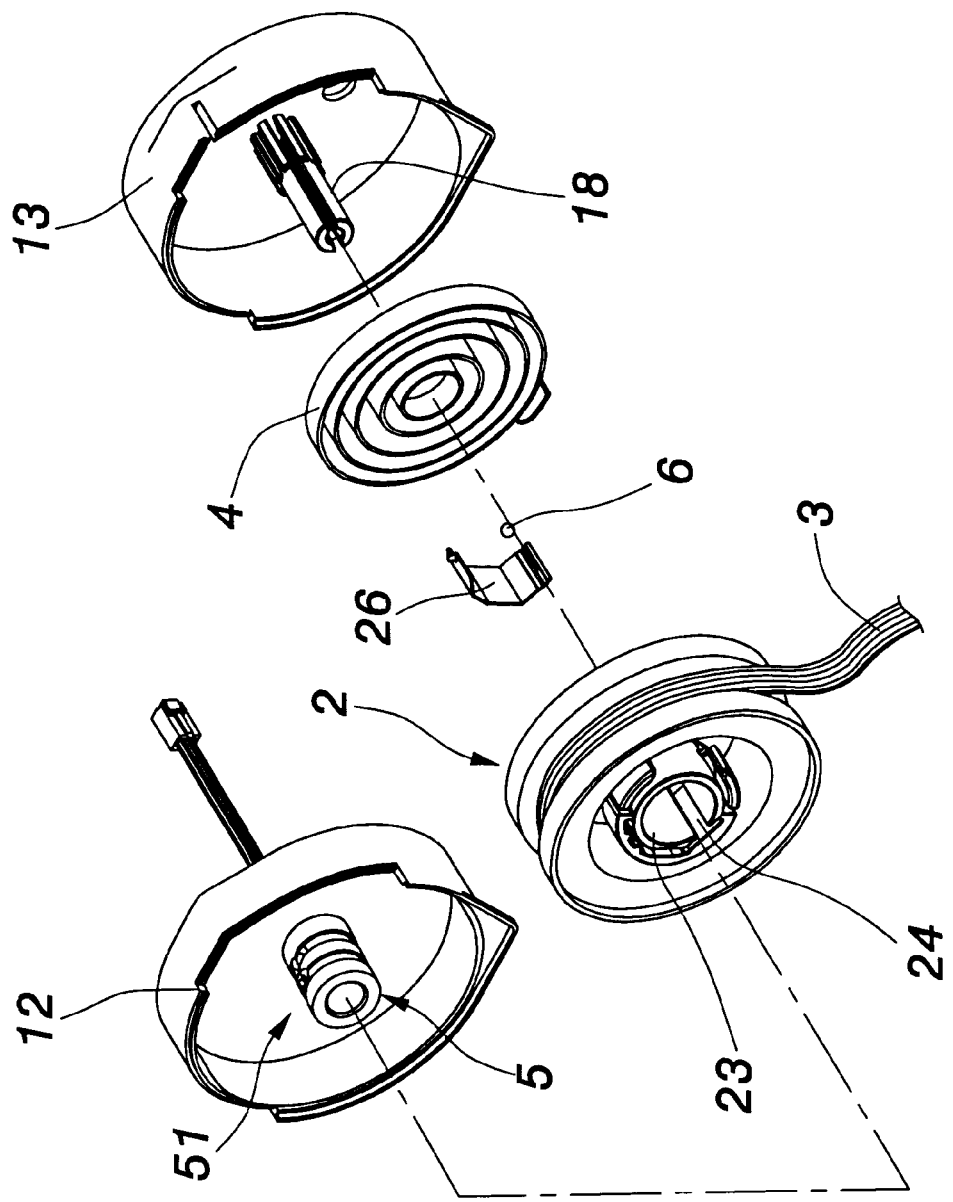
FIG. 10 is an exploded perspective diagram according to another embodiment of this invention.

Referring to FIG. 10, an alternative structure of the reel casing 1 is illustrated according to another embodiment of this invention. In FIG. 10, the reel casing 1 consists of a first half 12 and a second half 13. Further, only one terminal of the communication cable 3 protrudes from the reel casing 1 (single outlet type).

Those skilled in the art will readily observe that numerous modifications and alterations of the device may be made while retaining the teachings of the invention. For example, the RAM and the flash memory may be replaced with other similar memory devices known in the art. Accordingly, the above disclosure should be construed as limited only by the metes and bounds of the appended claims.

What is claimed is:

1. A cable reel with a positioning mechanism, comprising:
   a reel casing having a chamber therein;
   a cylindrical receptacle having a circumferential tracing line groove formed on a sidewall of the cylindrical receptacle;
   a winding plate having a pivot hole thereon and a guiding groove formed on an interior wall within the pivot hole, wherein the winding plate is pivotally mounted on the cylindrical receptacle through the pivot hole;
   a communication cable wound against the winding plate;
   a swirling spring connecting the reel casing with the winding plate; and
   a ball bearing movably disposed in the tracing line groove and the guiding groove.

2. The cable reel with a positioning mechanism of claim 1 wherein the reel casing is comprised of a main body, a first casing, and a second casing, the main body is a cylindrical hollow structure, and wherein the first casing and the second casing are the congruent halves, the main body, first casing, and second casing form the enclosure of the invention herein.

3. The cable reel with a positioning mechanism of claim 1 wherein two terminals of the communication cable protrude from a first aperture and a second aperture on the reel casing respectively.

4. The cable reel with a positioning mechanism of claim 1 wherein at the center of the first casing there is provided a spindle for mounting the winding plate, the cylindrical receptacle is placed on the second casing corresponding to the spindle, and one end of the swirling spring is secured to the spindle.

5. The cable reel with a positioning mechanism of claim 1 wherein the winding plate has a plate body and a winding ring protrudes from two opposite sides of the plate body.

6. The cable reel with a positioning mechanism of claim 1 wherein the swirling spring is disposed in a spring seat, a plurality of protrusions corresponding to a plurality of snapping holes at bottom of the spring seat are formed on winding ring of the winding plate, the protrusions are inserted into the snapping holes so that the spring seat is secured to the winding plate at one side and the winding plate and the spring seat can therefore rotate synchronously, the spring seat is also disposed in the chamber of the reel casing and is pivotally mounted on the spindle through the central hole.

7. The cable reel with a positioning mechanism of claim 1 wherein a spring piece is mounted in the pivot hole of the winding plate, the spring piece flexibly touches the ball bearing to restrain the ball bearing in the tracing line groove.

8. The cable reel with a positioning mechanism of claim 1 wherein the tracing line groove comprises a first trench, a first dropping portion, a positioning portion, a guiding face, a second trench, a second dropping portion, a third trench, and a third dropping portion, and wherein the first trench surrounds sidewall of the cylindrical receptacle, the first dropping portion, which has a relatively higher left side and lower right side, is disposed in the first trench and wherein the second trench surrounds sidewall of the cylindrical receptacle in a parallel manner with the first trench, the guiding face has a lower side connected with the second trench, the second dropping portion, which has a relatively higher right side and lower left side, is disposed in the second trench, and wherein the third trench is connected with joint between the second trench and the second dropping portion, the third dropping portion connects the other side of the third trench and the first trench.

* * * * *